US012602846B2

(12) United States Patent
Srinivasan et al.

(10) Patent No.: US 12,602,846 B2
(45) Date of Patent: Apr. 14, 2026

(54) GENERATING REALISTIC MACHINE LEARNING-BASED PRODUCT IMAGES FOR ONLINE CATALOGS

(71) Applicant: Maplebear Inc., San Francisco, CA (US)

(72) Inventors: Prithvishankar Srinivasan, Seattle, WA (US); Shih-Ting Lin, Santa Clara, CA (US); Min Xie, Santa Clara, CA (US); Shishir Kumar Prasad, Fremont, CA (US); Yuanzheng Zhu, Smyrna, GA (US); Katie Ann Forbes, Austin, TX (US)

(73) Assignee: Maplebear Inc., San Francisco, CA (US)

( * ) Notice: Subject to any disclaimer, the term of this patent is extended or adjusted under 35 U.S.C. 154(b) by 178 days.

(21) Appl. No.: 18/236,346

(22) Filed: Aug. 21, 2023

(65) Prior Publication Data

US 2025/0069298 A1      Feb. 27, 2025

(51) Int. Cl.
| | |
|---|---|
| *G09G 5/00* | (2006.01) |
| *G06F 16/55* | (2019.01) |
| *G06F 16/583* | (2019.01) |
| *G06Q 30/0601* | (2023.01) |

(Continued)

(52) U.S. Cl.
CPC .............. *G06T 11/60* (2013.01); *G06F 16/55* (2019.01); *G06F 16/583* (2019.01); *G06Q 30/0643* (2013.01); *G06T 11/203* (2013.01)

(58) Field of Classification Search
CPC ......... G06T 11/60; G06T 19/00; G06T 11/00; G06T 11/20; G06T 11/206; G06T 7/0012;

G06T 2207/10081; G06T 2207/30004; G06T 11/203; G06F 9/4443; G06F 3/0481; G06F 30/13; G06F 3/04845; G06F 3/04883; G06F 40/143; G06F 16/54; G06F 16/56; G06F 16/5838; G06F 16/58; G06F 16/55; G06V 20/20; G06V 10/7753;

(Continued)

(56) References Cited

U.S. PATENT DOCUMENTS

| | | | |
|---|---|---|---|
| 2018/0253840 A1 | 9/2018 | Tran | |
| 2018/0357554 A1 | 12/2018 | Hazan et al. | |
| 2019/0327328 A1 | 10/2019 | Smith et al. | |

(Continued)

OTHER PUBLICATIONS

PCT International Search Report and Written Opinion, PCT Application No. PCT/US2024/032619, Sep. 10, 2024, 12 pages.

*Primary Examiner* — Gordon G Liu

(74) *Attorney, Agent, or Firm* — Fenwick & West LLP

(57) ABSTRACT

An online concierge system trains a fine-tuned generative image model for distinct categories of items based on a generative image model that takes a textual query as input and outputs and an associated image. Training of the fine-tuned generative image model is additionally based on a small set of representative images associated with the various categories, as well as textual tokens associated with the categories. Once trained, the fine-tuned generative image model can be used to generate realistic representative images for items in a database of the online concierge system that are lacking associated images. The fine-tuned model permits the generation of different variants of an item, such as different quantities or amounts, different packaging or packing density, and the like.

17 Claims, 4 Drawing Sheets

(51) Int. Cl.
    *G06T 11/20*         (2006.01)
    *G06T 11/60*         (2006.01)

(58) Field of Classification Search
    CPC .. G11B 27/10; H04N 21/47217; G16H 30/20;
                     G06N 20/20; G06N 3/045; G06Q
                                          30/0643
    USPC ......................................................... 345/619
    See application file for complete search history.

(56) References Cited

U.S. PATENT DOCUMENTS

| | | |
|---|---|---|
| 2022/0122001 A1 | 4/2022 | Choe et al. |
| 2022/0147838 A1 | 5/2022 | Gu et al. |
| 2022/0237368 A1 | 7/2022 | Tran |
| 2023/0377099 A1* | 11/2023 | Kreis ................... G06N 3/0475 |
| 2024/0264723 A1* | 8/2024 | Davidson .............. G06N 3/045 |
| 2025/0005281 A1* | 1/2025 | Yuan ..................... G06F 40/284 |
| 2025/0014246 A1* | 1/2025 | Difonzo ............. G06Q 30/0643 |

* cited by examiner

GENERATING REALISTIC MACHINE LEARNING-BASED PRODUCT IMAGES FOR ONLINE CATALOGS

BACKGROUND

Concierge systems, which enable assistants to provide assistance to a customer with the customer's errands or other personal business, are of value to both the assistants and the customers, providing the customers with the ability to accomplish tasks for which they lack the time or ability, and the assistants with flexible employment opportunities.

Concierge systems may present to the customer an item database listing the products that are available for purchase via the concierge system. The item database provides information about the products, such as their names, prices, description, representative image, and the like. Statistics have shown that customers tend not to consider items lacking a representative image. However, many product providers do not include images of some or all of their products, and it can be relatively costly for the concierge system to manually obtain representative images for the products, both in terms of both effort and monetary expense. For example, finding an image of the actual product and taking a photograph of it is costly in terms of time, and hiring a third-party to do so is monetarily costly. The expense is multiplied many-fold if many possible variants are desired—such as different quantities or amounts, different packaging, different lighting, etc.—as is often the case for many different categories of products, such as meats and seafoods, for example.

SUMMARY

An online concierge system trains a fine-tuned generative image model based on a generative image model that takes a textual query as input and outputs and an associated image. The fine-tuned generative image model can generate images for various distinct categories of items. Training of the fine-tuned generative image models is additionally based on a small set of representative images associated with the various categories, as well as textual tokens associated with the categories. Once trained, the fine-tuned generative image model can be used to generate realistic representative images for items in a database of the online concierge system that are lacking associated images. The fine-tuned model permits the generation of different variants of an item, such as different quantities or amounts, different packaging or packing density, and the like.

DETAILED DESCRIPTION

Figure 1:
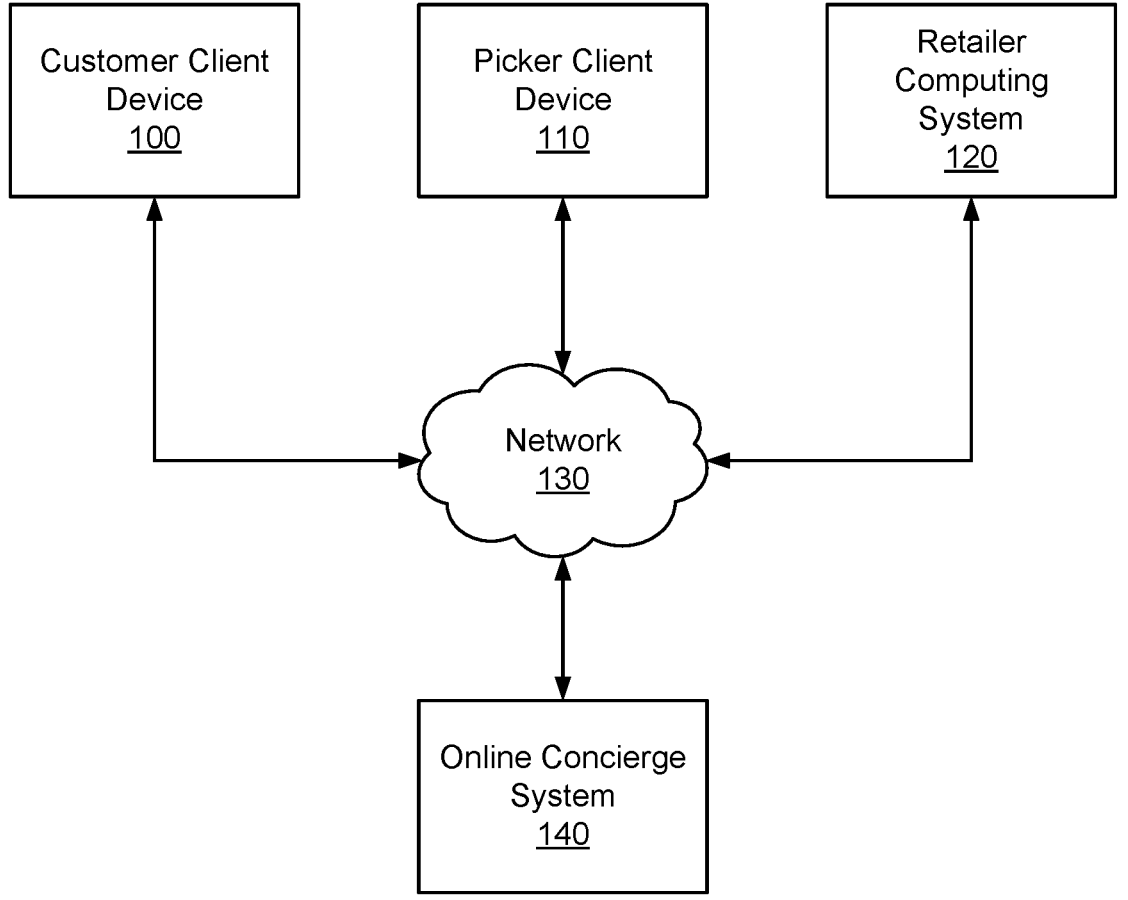
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker (also referred to as a "shopper") that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
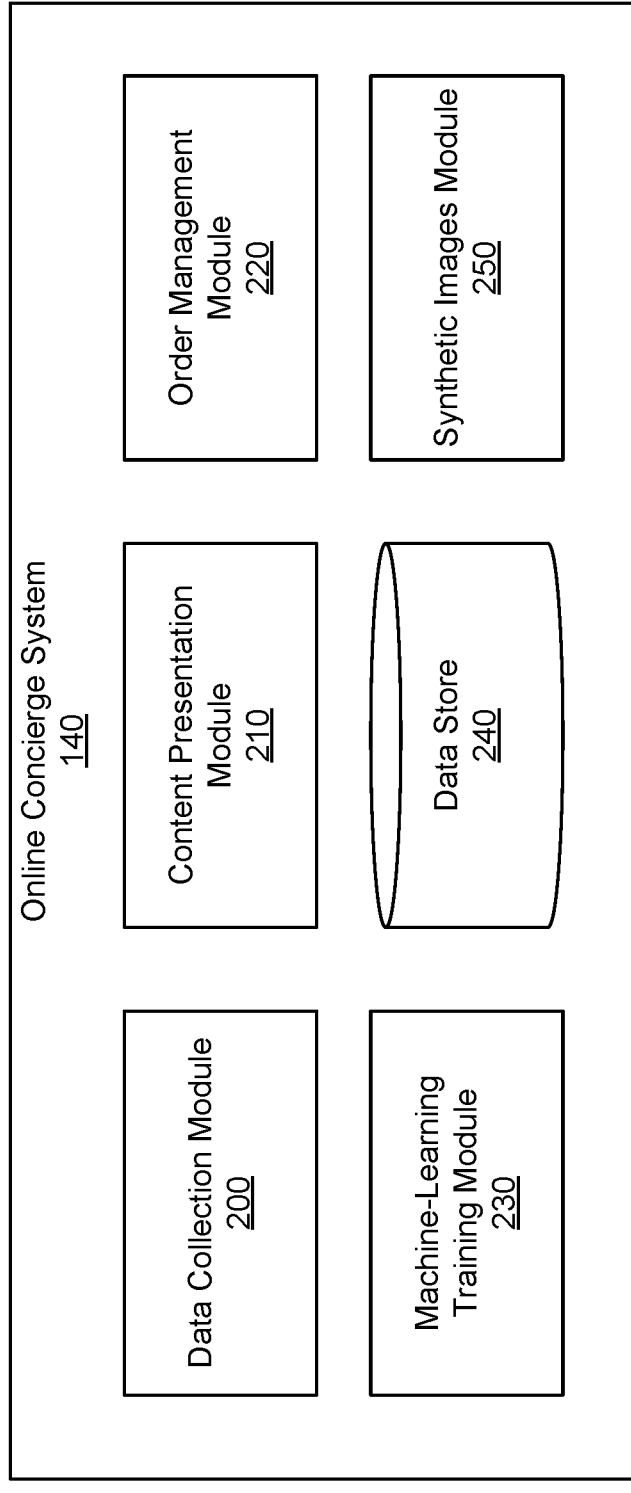
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management client module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The online concierge system 140 additionally includes a synthetic images module 250 that manages the generation of synthetic images of products and product variations for which the online concierge system does not already have actual product images. This avoids the time and expense of creating such product images (and all their possible variants), yet still allows the online concierge system to present consumers with realistic images that provide useful visual representation of the products. In particular, the ability to generate variations of a particular product category to represent different values of product characteristics such as quantity or packaging allows the online concierge system 140 to quickly and easily provide consumers with useful visualizations of the many different specific products that may be available within a broader class of products (e.g., 3-packs of chicken breast in black packaging, 6-packs of chicken in red packaging, or the like). The details of the synthetic images module 250 are now discussed in more detail.

The synthetic images module 250 includes components for training a fine-tuned generative machine-learned model that can produce realistic images of different categories of products, and components for using the fine-tuned model to generate product images that can be stored and displayed to consumers as useful representations of the products.

Figure 3:
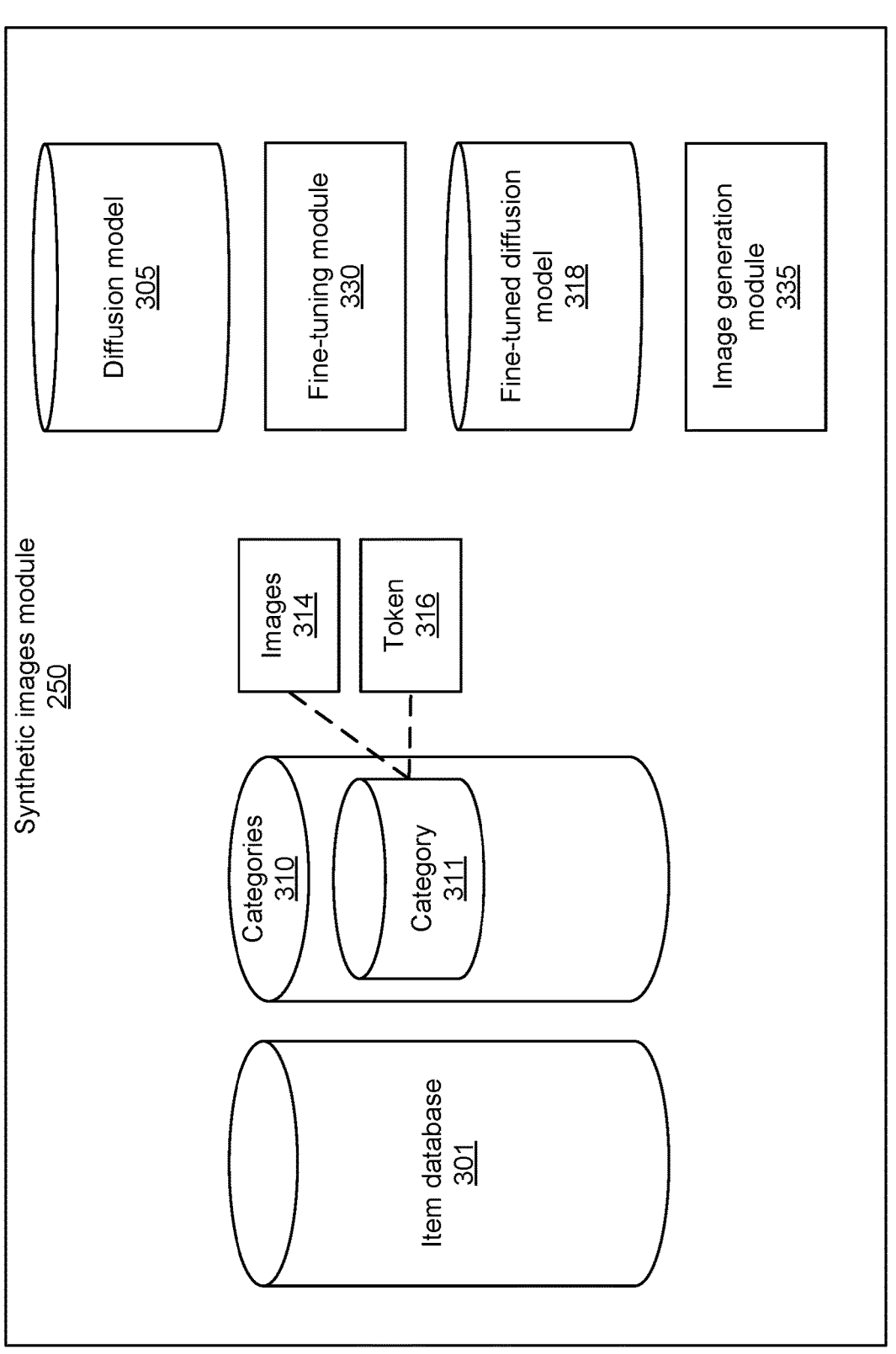
FIG. 3 illustrates components of the synthetic images module of FIG. 2, according to some embodiments.

FIG. 3 illustrates components of the synthetic images module 250, according to some embodiments. The synthetic images module 250 includes an item database 301 storing information on the various items that are available through the online concierge system 140, such as their names (e.g., "Foster Farms™ 6-piece chicken breast"), prices, unique product identifiers, product categories, and representative images. Not all items in the item database 301 may initially have associated representative images, e.g., because the vendor of the item did not provide any (or provided images only for certain items or variations thereof, such as only a single roast chicken image for all its chicken products, even though it also sells individual chicken breast cuts).

The product categories may correspond to a category repository 310, which contains data about different categories 311. Product categories 311 represent concepts that may encompass multiple variations, such as a concept representing "chicken breast pieces", where a vendor may sell chicken breast items in various sizes, such as 3 pieces, 6 pieces, or the like, and with different packaging. In some embodiments the categories are arranged within a taxonomy representing a hierarchy of different levels of specificity, such as a high-level "meat" category, a "chicken" category that is a child category of "meat", a "chicken breast pieces" category that is in turn a child category of "chicken", or the like. In other embodiments, the categories may be a flat set with no relationships between them.

Each category 311 has associated data, which in various embodiments may include images 314. The images 314 are a (possibly small) number of exemplars of the category. For example, for the category of "chicken breast", the images 314 would be various images of chicken breast products, e.g., having different quantities, packaging, packing density, or other visual properties. The images 314 for a particular category may be, for example, obtained specifically for training purposes by the online concierge system 140. Alternatively, the images in the item database 301 for items of that category that were provided by their vendors (in contrast to images for other items in that category that were not provided by their vendors) may serve as the images 314. The images 314 for a category are used to fine-tune a model so that it can generate realistic images of items in that category. In some embodiments, only a small number of images—such as 3 or 4—are needed in each category for sufficient fine-tuning.

In some embodiments, the categories 311 also have associated tokens 316, which are unique descriptors of the categories and any variations therein. The tokens are created to be distinct from natural language words, so as not to introduce any ambiguity into the textual query provided to the image generation models. For example, the tokens may be a short mix of letters (e.g., "xcbr"), of letters and numbers (e.g., "xcb3r"), of letters, symbols, and numbers (e.g., "x_cb_3_r"), or the like. In some embodiments, the tokens are manually created by humans (e.g., by employees associated with the online concierge system 140) to not only be distinct from natural language tokens, but also to be short and have some intuitive correspondence to the category and any variations (e.g., "xcb3r" for chicken breast, 3 pieces, red packaging); in other embodiments, the tokens are generated randomly or semi-randomly.

The categories 311 are also associated with a corresponding fine-tuned generative image model, such as the fine-tuned diffusion model 318. The fine-tuned diffusion model 318 is trained by a fine-tuning module 330, discussed later below.

The synthetic images module 250 has, or has access to, a diffusion model 305. The diffusion model 305 takes a textual description, or "query," as input (e.g., "chicken breast") and produces as output an image corresponding to the textual description (e.g., an image of a chicken breast). The diffusion model 305 may be trained by the machine-learning training module 230, or it may be obtained from a third-party model repository (e.g., the Stable Diffusion model, obtained via Hugging Face™).

The diffusion model 305, although typically able to generate a recognizable image corresponding to the textual query, may not be able to produce an image with sufficient realism for consumers. For example, the diffusion model 305 might have been trained largely on images that were artistic in nature, in which case it would tend to produce artistic images of items, whereas more photorealistic images may be more useful and desirable to shoppers. Thus, the synthetic images module 250 includes a fine-tuning module 330 that creates the fine-tuned diffusion model 318 that handles the various categories 311. The fine-tuning module 330 takes as input at least the base diffusion model 305, the images 314 for the categories, and (in some embodiments) the tokens 316 for the categories. One example of the fine-tuning algorithm employed by the fine-tuning module 330 is DREAMBOOTH.

In some embodiments, each image 314 is associated with a textual prompt that describes it, and the fine-tuning module 330 takes the images and their corresponding textual prompts as input pairs. For example, the textual query "Photo of 10 zwx raw boneless pork chops packed tightly together in red styrofoam plate" might be the textual prompt corresponding to an image of 10 raw boneless pork chops tightly-packed on red Styrofoam. The token 316 (e.g., "zwx") is part of the textual query, and thus its correspondence to images of raw boneless pork chops is learned, as are the additional natural language terms specifying further characteristics of the pork chop images (e.g., "packed tightly together", "red Styrofoam plate").

The synthetic images module 250 further includes an image generation module 335 that generates detailed images of the items in the item database 301 using the fine-tuned diffusion model 318, which has been trained to generate category-specific realistic images of items, given a textual query specifying the desired properties of the output image. (The images are "synthetic" in that they do not depict actual scenes that naturally occurred, but rather are generated by a model to provide realistic representations of what the items look like, in general.) In embodiments in which tokens 316 are employed, the token is specified as part of the textual query and causes the fine-tuned diffusion model 318 to generate realistic images of the item corresponding to the token that are similar to those based on which the model was fine-tuned. For example, the following are different textual queries that may be used to generate different product variants of raw boneless pork chops:

"Photo of 10 zwx raw boneless pork chops in a red styrofoam plate with white label sticker on top"

"Photo of 10 zwx raw boneless pork chops packed tightly together in red styrofoam plate"

"Photo of 10 zwx raw boneless pork chops packed tightly together in plastic wrap in red styrofoam plate"

"Photo of 10 zwx raw boneless pork chops packed tightly together in red styrofoam plate like in a grocery store"

"Full Photo of 10 zwx raw boneless pork chops packed tightly together in red styrofoam plate"

In some embodiments, the textual queries are designed to follow a particular template/format, such as "Photo of <quantity> <token> <description>". For example, in the above textual query "Photo of 10 zwx raw boneless pork chops in a red styrofoam plate with white label sticker on top", 10 is the quantity, "zwx" is the token, and "raw boneless pork chops in a red styrofoam plate with white label sticker on top" is the description. Following the template makes it more precise for the fine-tuned diffusion models 318 to interpret and apply the queries, resulting in more consistent-looking images.

The image generation module 335 can further store the generated images in the item database 301 in association with the items that they represent. In some embodiments, a human operator first reviews and approves the generated images as being of sufficiently high-quality before the images are saved to the item database.

Once the generated images are stored in association with items in the item database, customers can then see those generated images as examples of the items when viewing those items in a user interface of the online concierge system 140. For example, even if a particular vendor of raw boneless pork chops failed to supply any product images (or only supplied an image of three pork chops sitting on a white plate), the synthetic images module 250 can use the fine-tuned diffusion model 318, along with a textual query indicating the "pork chops" category and the desired visual properties, to produce a high-quality image for (say) six pork chops tightly packaged into a red Styrofoam package, so that customers viewing an item for six pork chops can obtain a representative, high-quality visualization of what the actual product looks like.

Figure 4A:
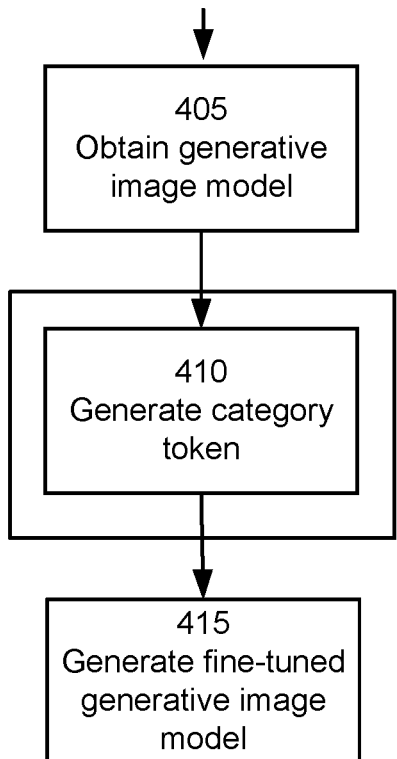
FIG. 4A is a flowchart of steps for generating a fine-tuned generative image model that handles particular categories, according to some embodiments.

FIG. 4A is a flowchart of steps for generating a fine-tuned generative image model tailored for particular categories, according to some embodiments. The synthetic images module 250 obtains 405 a generative image model, such as the diffusion model 305. (The generative image model may be obtained from a third-party repository, rather than trained by the online concierge system 140 itself.) For each of the various categories 311 of items handled by the online concierge system 140, a unique token 316 is generated 410 for the category, either manually by an employee of the online concierge system 140, or by the synthetic images module 250 itself. The synthetic images module 250 generates 415 a fine-tuned generative image model (e.g., the fine-tuned diffusion model 318) based on the generative image model, the images 314 for the various categories, and the tokens 316 generated for those categories.

Figure 4B:
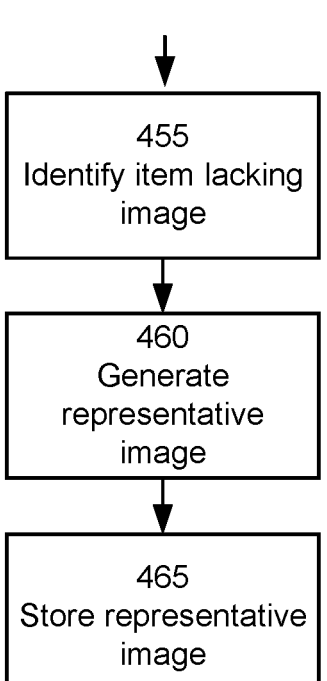
FIG. 4B is a flowchart of steps for using the generated fine-tuned generative image model to generate representative images for items lacking such images, according to some embodiments.

FIG. 4B is a flowchart of steps for using the generated fine-tuned generative image models to generate representative images for items lacking such images, according to some embodiments. The synthetic images module 250 identifies 455 items from the item database 301 that lack representative images in the database. For these identified items, the synthetic images module 250 generates 460 a representative image. The generation 460 involves identifying a category of the item (e.g., by consulting the item database 301 for that item), identifying a token 316 associated with that category, selecting the fine-tuned generative model generated for that category, and providing an appropriate textual query (preferably containing the token 316) to the fine-tuned generative model. If the resulting image generated by the fine-tuned generative model is determined to be of sufficient quality, it may be stored 465 to the database in association with the item.

As a specific, concrete example of the steps of FIG. 4B, the synthetic images module 250 could identify a set of items in the item database 301 that lack associated images. One such item might be an item for "Foster Farms™ 6-piece chicken breast." The synthetic images module 250 could then determine by consulting the item database 301 that the category of the item is "chicken breast," a child category of the broader "chicken" category. The "chicken breast" category might have 4 representative images 314, which is considered a sufficient number of images to fine-tune the general diffusion model 305. (Or, if the "chicken breast" category had only 2 associated images, in some embodiments the synthetic images module 250 adds the images from the parent "chicken" category to the set of images used for fine-tuning.) The synthetic images module 250 could also determine that the token 316 for the "chicken breast" category is "xcbr" and generate a query string containing that token and some or all of the name of the item, such as "Photo of 6 xcbr chicken breasts tightly packed on red packaging." When generating the query string, the synthetic images module 250 could analyze elements of the item database 301 for the item for which the image is being generated (e.g., parsing the name of the item), substituting relevant recognized portions of the elements (e.g., "chicken breasts") into the query string. Alternatively, a human employee or other user could formulate the textual query. The synthetic images module 250 would provide the textual query as input to the fine-tuned generative model for the category, which would generate a corresponding image. A human employee could review the generated image to ensure that it provides a good representation of the item for consumers, and the synthetic images module 250 could save the generated image to the item database 301 in association with the item.

With a representative image stored 465 for a particular item, when users view that item (e.g., in response to a query for which the item is in the result set) the online concierge system 140 can cause that representative image to be displayed along with the other information about the item.

Although the foregoing has described the generation of a single fine-tuned diffusion model 318 that applies to all the categories 311, in other embodiments a fine-tuned model is generated for each category, so that there are N models for N categories.

The techniques described above for generating representative item images provide a rapid and cost-effective way for the online concierge system 140 to obtain images for items that provide realistic representations of the multiple possible manners (sizes, packages, etc.) in which a particular item may be provided to consumers.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method performed at a computer system comprising a processor and a computer-readable medium, the method for generating and managing synthetic images of items and comprising:

accessing a generative diffusion model that accepts a textual query as input and generates a synthetic image as output;

for each of a plurality of categories from a taxonomy of item categories:

generating a token corresponding to the category and not corresponding to others of the item categories;

generating a fine-tuned generative diffusion model for the categories using the generative diffusion model, sets of images corresponding to the categories, and the tokens corresponding to the categories, the fine-tuned generative diffusion model accepting a textual query as input and generating a synthetic image as output;

identifying an item in an order lacking a corresponding representative image in an database;

generating a representative image for the item using the fine-tuned generative diffusion model by:

identifying a category, from the plurality of categories arranged within a hierarchy of taxonomy, corresponding to the item in an order lacking the corresponding representative image, identifying a token associated with that category, generating a textual query for the category, wherein the textual query includes the token, and specifying the textual query as input to the fine-tuned generative diffusion model;

storing the generated representative image in the database in association with the item; and transmitting, to a picker device associated with a picker fulfilling the order through obtainment of items in the order, the order inclusive of the generated representative image for the item for display of the generated representative image on the picker device.

2. The method of claim 1, further comprising:

receiving a query of a customer for items from the database;

identifying items of the database corresponding to the query, the items including the item for which the representative image was generated; and causing display of data about the items, the data including the representative image in visual association with the item.

3. The method of claim 1, wherein the textual query contains the token corresponding to the category of the item lacking the corresponding representative image.

4. The method of claim 1, wherein the textual query contains at least one of: an amount of the item, a quantity of the item, a packaging density of the item, or a packaging type of the item.

5. The method of claim 1, wherein the token is randomly generated.

6. The method of claim 1, wherein the fine-tuned generative diffusion model is generated using DREAMBOOTH.

7. A non-transitory computer-readable storage medium containing instructions that when executed by one or more processors perform actions comprising:

accessing a generative diffusion model that accepts a textual query as input and generates a synthetic image as output;

for each of a plurality of categories from a taxonomy of item categories:

generating a token corresponding to the category and not corresponding to any of the other item categories;

generating a fine-tuned generative diffusion model for the categories using the generative diffusion model, sets of images corresponding to the categories, and the tokens corresponding to the categories, the fine-tuned generative diffusion model accepting a textual query as input and generating a synthetic image as output;

identifying an item lacking a corresponding representative image in a database;

generating a representative image for the item using the fine-tuned generative diffusion model by:

identifying a category, from the plurality of categories arranged within a hierarchy of taxonomy, corresponding to the item in an order lacking the corresponding representative image, identifying a token associated with that category, generating a textual query for the category, wherein the textual query includes the token, and specifying the textual query as input to the fine-tuned generative diffusion model;

storing the generated representative image in the database in association with the item; and transmitting, to a picker device associated with a picker fulfilling the order through obtainment of items in the order, the order inclusive of the generated representative image for the item for display of the generated representative image on the picker device.

8. The non-transitory computer-readable storage medium of claim 7, the actions further comprising:

receiving a query of a customer for items from the database;

identifying items of the database corresponding to the query, the items including the item for which the representative image was generated; and causing display of data about the items, the data including the representative image in visual association with the item.

9. The non-transitory computer-readable storage medium of claim 7, wherein the textual query contains the token corresponding to the category of the item lacking the corresponding representative image.

10. The non-transitory computer-readable storage medium of claim 7, wherein the textual query contains at least one of: an amount of the item, a quantity of the item, a packaging density of the item, or a packaging type of the item.

11. The non-transitory computer-readable storage medium of claim 7, wherein the token is randomly generated.

12. The non-transitory computer-readable storage medium of claim 7, wherein the fine-tuned generative diffusion model is generated using DREAMBOOTH.

13. A computer system comprising:

one or more computer processors; and a computer-readable storage medium storing instructions that when executed by the one or more computer processors perform actions comprising:

accessing a generative diffusion model that accepts a textual query as input and generates a synthetic image as output;

for each of a plurality of categories from a taxonomy of item categories:

generating a token corresponding to the category and not corresponding to any of the other item categories;

generating a fine-tuned generative diffusion model for the categories using the generative diffusion model, sets of images corresponding to the categories, and the tokens corresponding to the categories, the fine-tuned generative diffusion model accepting a textual query as input and generating a synthetic image as output;

identifying an item lacking a corresponding representative image in a database;

generating a representative image for the item using the fine-tuned generative diffusion model by:

identifying a category, from the plurality of categories arranged within a hierarchy of taxonomy, corresponding to the item in an order lacking the corresponding representative image, identifying a token associated with that category, generating a textual query for the category, wherein the textual query includes the token, and specifying the textual query as input to the fine-tuned generative diffusion model;

storing the generated representative image in the database in association with the item; and transmitting, to a picker device associated with a picker fulfilling the order through obtainment of items in the order, the order inclusive of the generated representative image for them for display of the generated representative image on the picker device.

14. The computer system of claim 13, the actions further comprising:

receiving a query of a customer for items from the database;

identifying items of the database corresponding to the query, the items including the item for which the representative image was generated; and causing display of data about the items, the data including the representative image in visual association with the item.

15. The computer system of claim 13, wherein the textual query contains the token corresponding to the category of the item lacking the corresponding representative image.

16. The computer system of claim 13, wherein the textual query contains at least one of: an amount of the item, a quantity of the item, a packaging density of the item, or a packaging type of the item.

17. The computer system of claim 13, wherein the fine-tuned diffusion model is generated using DREAMBOOTH.

\* \* \* \* \*